United States Patent
Kwon et al.

(10) Patent No.: US 10,069,158 B2
(45) Date of Patent: Sep. 4, 2018

(54) FUEL CELL SYSTEM AND METHOD OF CONTROLLING THE SAME

(71) Applicant: Hyundai Motor Company, Seoul (KR)

(72) Inventors: Sang Uk Kwon, Gyeonggi-do (KR); Soon Il Jeon, Gyeonggi-do (KR); Sung Gone Yoon, Gyeonggi-do (KR); Sae Hoon Kim, Gyeonggi-do (KR)

(73) Assignee: Hyundai Motor Company, Seoul (KR)

(*) Notice: Subject to any disclaimer, the term of this patent is extended or adjusted under 35 U.S.C. 154(b) by 402 days.

(21) Appl. No.: 14/705,566

(22) Filed: May 6, 2015

(65) Prior Publication Data

US 2016/0190620 A1     Jun. 30, 2016

(30) Foreign Application Priority Data

Dec. 24, 2014 (KR) .................. 10-2014-0188008

(51) Int. Cl.
*H01M 8/04* (2016.01)
*H01M 8/04746* (2016.01)
(Continued)

(52) U.S. Cl.
CPC ......... *H01M 8/04753* (2013.01); *H01M 8/04* (2013.01); *H01M 8/04089* (2013.01); *H01M 8/04141* (2013.01); *H01M 8/04231* (2013.01); *H01M 8/04328* (2013.01); *H01M 8/04388* (2013.01); *H01M 8/04447* (2013.01); *H01M 8/04455* (2013.01); *H01M 8/04477* (2013.01); *H01M 2250/20* (2013.01); *Y02T 90/32* (2013.01)

(58) Field of Classification Search
CPC .............. H01M 8/04; H01M 8/04231; H01M 8/04447; H01M 8/04753; H01M 8/04089; H01M 8/04141; H01M 8/04328; H01M 8/04388; H01M 8/04455; H01M 8/04477; H01M 2250/20; Y02T 90/32

See application file for complete search history.

(56) References Cited

U.S. PATENT DOCUMENTS

| | | | |
|---|---|---|---|
| 6,884,534 B2 * | 4/2005 | Wheat .............. | H01M 8/04126 429/413 |
| 7,582,370 B2 * | 9/2009 | Goto ................ | H01M 8/04223 429/424 |

(Continued)

FOREIGN PATENT DOCUMENTS

| JP | 2004-172027 A | 6/2004 |
|---|---|---|
| JP | 2008-021485 A | 1/2008 |
| KR | 2008-0048077 A | 5/2008 |

OTHER PUBLICATIONS

JP 2008021485MT.*
JP 200802148 dewent Abstract.*

*Primary Examiner* — Alexander Usyatinsky
(74) *Attorney, Agent, or Firm* — Mintz Levin Cohn Ferris Glovsky and Popeo, P.C.; Peter F. Corless

(57) ABSTRACT

A fuel cell system and a method of controlling the fuel cell system are provided. The fuel cell system includes at least one bypass valve that is disposed between a passage in an inlet of a fuel cell stack and a bypass passage that is branched from the passage within the inlet and that is connected to a discharge port of the fuel cell stack. In addition, a controller bypasses air supplied from an air blower to the discharge port by adjusting an opening degree of the bypass valve.

18 Claims, 4 Drawing Sheets

(51) Int. Cl.
*H01M 8/04223* (2016.01)
*H01M 8/0444* (2016.01)
*H01M 8/04089* (2016.01)
*H01M 8/04119* (2016.01)
*H01M 8/0432* (2016.01)
*H01M 8/0438* (2016.01)

(56) References Cited

U.S. PATENT DOCUMENTS

| | | | |
|---|---|---|---|
| 2007/0287044 A1* | 12/2007 | Arthur | H01M 8/04097 |
| | | | 429/415 |
| 2010/0167145 A1 | 7/2010 | Kume | |
| 2011/0183225 A1* | 7/2011 | Harris | H01M 8/04455 |
| | | | 429/443 |
| 2014/0156128 A1* | 6/2014 | Wake | B60L 1/003 |
| | | | 701/22 |

* cited by examiner

FUEL CELL SYSTEM AND METHOD OF CONTROLLING THE SAME

CROSS REFERENCE TO RELATED APPLICATION

The present application claims priority of Korean Patent Application Number 10-2014-0188008 filed on Dec. 24, 2014, the entire contents of which application are incorporated herein for all purposes by this reference.

BACKGROUND

1. Field of the Invention

The present invention generally relates to a fuel cell system and a method of controlling the fuel cell system. More particularly, the present invention relates to a fuel cell system and a method of controlling the same, which dilute emitted hydrogen using a bypass valve disposed between a bypass passage and a passage at an inlet of a fuel cell stack.

2. Description of the Related Art

A fuel cell vehicle includes a fuel cell stack with laminated multiple fuel cells that are used as a power source; a fuel supply system configured to supply hydrogen as a fuel for the fuel cell stack; an air supply system configured to supply oxygen as an oxidant necessary for electrochemical reactions; and a water and heat management system configured to adjust temperature of the fuel cell stack. The fuel supply system decompresses compressed hydrogen within a hydrogen tank and supplies the decompressed hydrogen to a fuel electrode (anode) of the stack. The air supply system is configured to supply air suctioned from exterior using an air blower to an air electrode (cathode) of the stack.

When hydrogen and air are provided to the fuel electrode and air electrode of the stack, respectively, hydrogen ions are extracted through a catalysis reaction at the fuel electrode. The separated hydrogen ions are delivered to the anode through an electrolyte membrane, and the hydrogen ions and electrons from the fuel electrode produce an electrochemical reaction with oxygen to generate electric energy at the anode. Specifically, an electrochemical oxidation of hydrogen at the fuel electrode and electrochemical reduction of oxygen at the air electrode induces the electrons to move, and moving of the electrons generates electricity and heat. Additionally, water vapor or water is generated by the chemical action of combining hydrogen with oxygen.

An emission device is configured to emit unreacted hydrogen and oxygen, and by-products generated during the electric energy generation including water vapor, water, and heat. Further, gases such as water vapor, hydrogen, and oxygen are emitted to the air through a ventilation hood. Regarding emissions, to satisfy environmental standards, hydrogen should be emitted after being diluted with air. Accordingly, a method for decreasing the amount of hydrogen when an ignition of a fuel cell vehicle is turned off has been disclosed. However, as according to this method of the related art, the durability of a fuel cell stack may be damaged and thus, a method for diluting hydrogen with air supplied from an air supply system of the fuel cell system is required.

SUMMARY

Accordingly, the present invention provides a fuel cell system and a method of controlling the same, which may dilute emitted hydrogen using a bypass valve disposed between a bypass passage and a passage at an inlet of a fuel cell stack.

A fuel cell system according to an exemplary embodiment of the present invention may include: at least one bypass valve disposed between a passage in an inlet of a fuel cell stack and a bypass passage branched from the passage in the inlet and connected to a discharge port of the fuel cell stack; and a controller for bypassing air supplied from an air blower to the discharge port by adjusting an opening degree of the bypass valve. The bypass valve may be disposed in a location that corresponds to at least one of between the air blower and a humidifier and between the humidifier and an inlet of a fuel cell stack.

A method of controlling the fuel cell system according to an exemplary embodiment of the present invention may include: estimating, after an ignition is turned off or after hydrogen is supplied by a Wakeup state, hydrogen concentrations in an air supply system and an air discharge system that includes an air discharge part for discharging air from a fuel cell stack, the air supply system including a cathode of the fuel cell stack, a humidifier, and an air blower; and adjusting an opening degree of a bypass valve when the vehicle is subsequently started, based on the estimated hydrogen concentrations.

The estimation of the hydrogen concentrations may include determining, by measuring an elapsed time after the ignition is turned off or after hydrogen is supplied by a Wakeup mode or state, that the hydrogen concentrations in the air supply system and the air discharge system will be increased when the measured time is greater than a first reference time period. In addition, in the adjustment of the opening degree of the bypass valve, air supplied from the air blower may be bypassed to a discharge port of the fuel cell stack by adjusting the opening degree of the bypass valve when the hydrogen concentrations are predicted to be increased.

Further, the estimation of the hydrogen concentrations may include determining, by measuring an elapsed time after the ignition is turned off or after hydrogen is supplied by Wakeup, that the hydrogen concentrations in the air supply system and the air discharge system will be decreased when the measured time is greater than a second reference time period. Additionally, in the adjustment of the opening degree of the bypass valve, air supplied from the air blower may not be bypassed to a discharge port of the fuel cell stack by adjusting the opening degree of the bypass valve when the hydrogen concentrations are predicted to be decreased.

The estimation of the hydrogen concentrations may also include determining, by measuring an elapsed time after the ignition is turned off or after hydrogen is supplied by Wakeup, that the hydrogen concentrations in the air supply system and the air discharge system have been increased when the measured time is between a first reference time period and a second reference time period. In addition, in the adjustment of the opening degree of the bypass valve, air supplied from the air blower may be bypassed to a discharge port of the fuel cell stack by adjusting the opening degree of the bypass valve when the hydrogen concentrations are predicted to have been increased.

The adjustment of the opening degree of the bypass valve may include varying an amount of air bypassed to the discharge port by adjusting the opening degree of the bypass valve based on the estimated hydrogen concentrations. The process may also include increasing the amount of air bypassed to the discharge port by increasing the opening degree of the bypass valve as the estimated hydrogen concentrations are substantially high (e.g., greater than a predetermined concentration) and increasing the amount of air bypassed to the discharge port by increasing a time period during which the opening degree of the bypass valve is adjusted as the estimated hydrogen concentrations are substantially high.

The hydrogen concentrations estimated in estimating of the hydrogen concentrations may be proportional to a pressure of hydrogen measured at an anode when supply of hydrogen from exterior is stopped. The hydrogen concentrations may also be proportional to an amount of purged hydrogen when hydrogen purging occurs after the ignition is turned off. The first reference time period may be decreased as an amount of hydrogen crossover from an anode to a cathode of a fuel cell stack is increased.

Moreover, the amount of hydrogen crossover depends on a pressure at the anode and a temperature or a humidified state of a fuel cell stack, and the amount of hydrogen crossover may be increased as the pressure at the anode increases, as the temperature of the fuel cell stack increases, and as the humidified state of the fuel cell stack increases. The first reference time period set when hydrogen purging occurs after the ignition is turned off may be less than the time period set when the hydrogen purging does not occur. The second reference time period may decrease as an inflow of air from exterior to a fuel cell stack is increased.

The increase in the inflow of air from exterior may be determined by a value measured by an air flow sensor, or determined by whether a temperature of the fuel cell stack increases or whether an air shutoff valve for preventing inflow of air from exterior operates. The second reference time period may be increased as a pressure of hydrogen at an anode is increased, and the second reference time period may be decreased as the pressure of hydrogen at the anode decreases, the pressure of hydrogen being measured at the anode when supply of hydrogen from exterior is stopped. The second reference time period set when hydrogen purging occurs after the ignition is turned off may be greater than the time period set when the hydrogen purging does not occur.

A fuel cell system and a method of controlling the same according to an exemplary embodiment of the present invention may bypass air to a discharge port through a bypass valve and a bypass passage arranged in an outlet of an air blower or arranged in a passage at an inlet of a fuel cell stack. Therefore, though hydrogen accumulated in an air supply system is rapidly discharged when the air blower is started, the hydrogen diluted with the bypassed air may be discharged. Additionally, since a hydrogen concentration in the air supply system may be estimated, the opening degree of the bypass valve may be adjusted based on the estimated hydrogen concentration, whereby air of which the amount corresponds to the amount of hydrogen to be discharged may be supplied to the discharge port.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Figure 1:
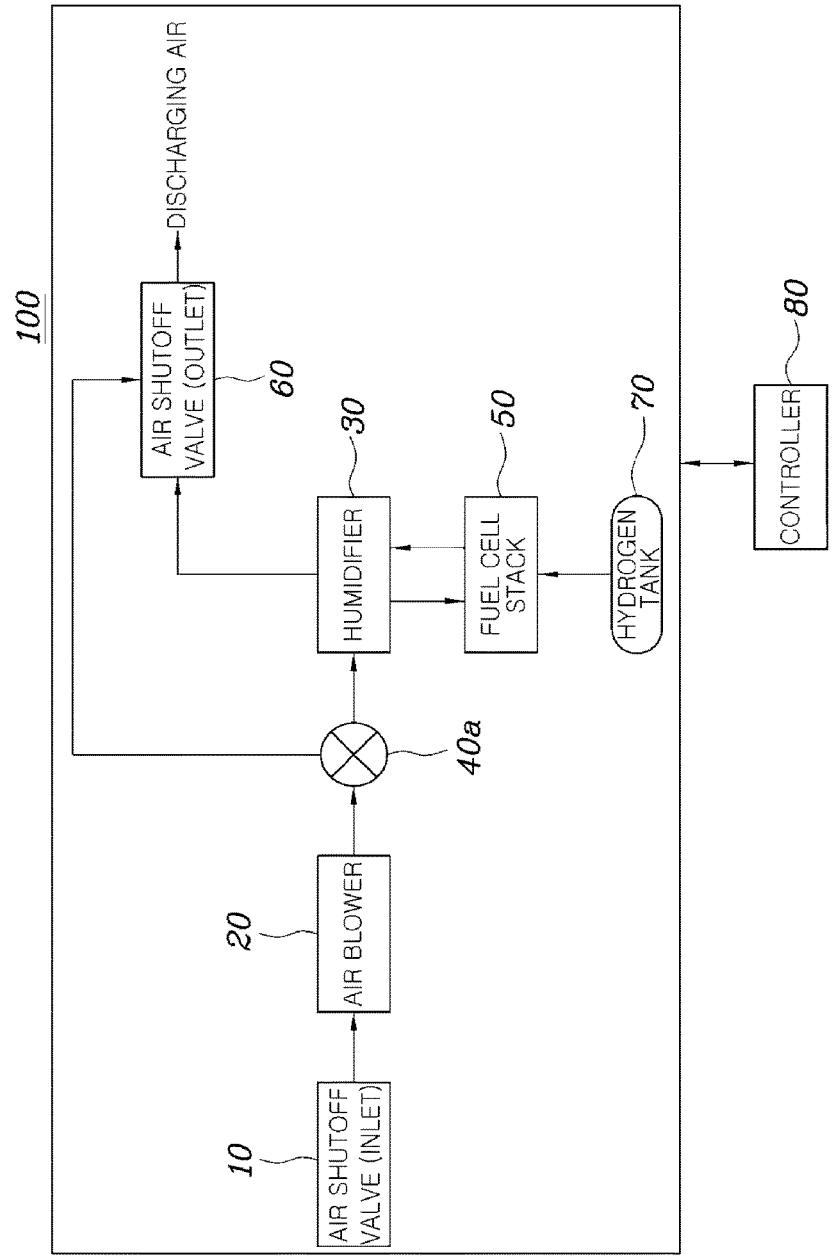
FIGS. 1 and 2 are exemplary block diagrams of a fuel cell system according to an exemplary embodiment of the present invention.

Specific structural or functional descriptions in the exemplary embodiments of the present invention disclosed in the specification should not be construed as limited the invention, and are only for description of the exemplary embodiments of the present invention, which can be embodied in various forms. Specific exemplary embodiments are illustrated in the drawings and described in detail in the specification or application because the exemplary embodiments of the present invention may have various forms and modifications. It should be understood, however, that there is no intent to limit the exemplary embodiments of the present invention to the specific exemplary embodiments, but the intention is to cover all modifications, equivalents, and alternatives included to the scope of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present invention. It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

Reference now should be made to the drawings, in which the same reference numerals are used throughout the different drawings to designate the same or similar components.

Figure 2:
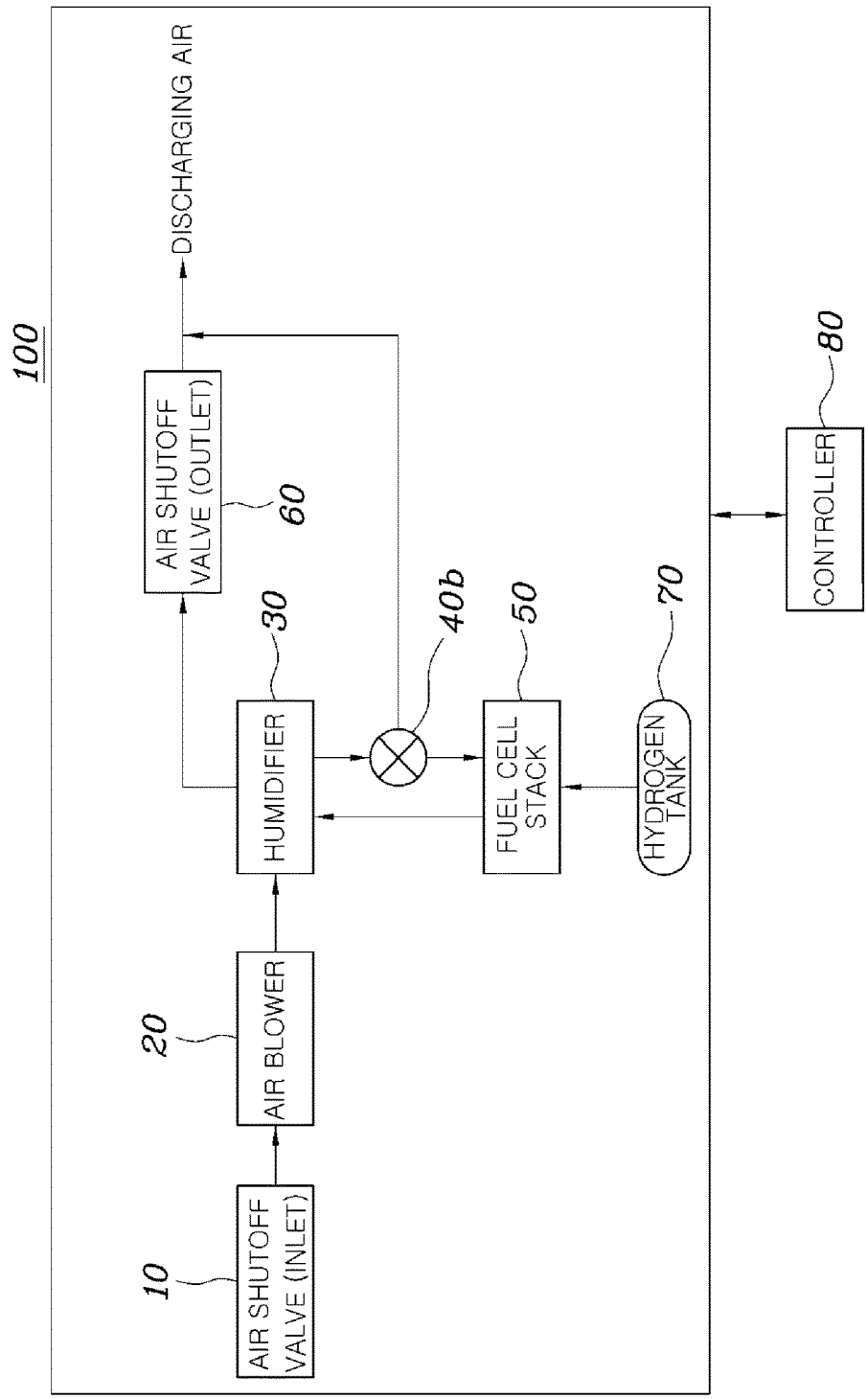

FIGS. 1 and 2 are exemplary block diagrams of a fuel cell system 100 according to an exemplary embodiment of the present invention. Referring to FIGS. 1 and 2, a fuel cell system 100 according to an exemplary embodiment of the present invention may include an air shutoff valve 10 within an inlet, an air blower 20, a humidifier 30, bypass valves 40a and 40b, a fuel cell stack 50, an air shutoff valve 60 within an outlet, a hydrogen tank 70, and a controller 80. In addition, the fuel cell system 100 may further include a filter (not illustrated) disposed in front of the air shutoff valve 10 within the inlet and a silencer (not illustrated) disposed between an inlet of the air blower 20 and an outlet of the air shutoff valve 10 within the inlet of the fuel cell system 100. A purge valve (not illustrated) and a drain valve (not illustrated) indisposed within an outlet of an anode (fuel electrode) may be further included. As parts of the fuel cell system 100 are generally understood to those skilled in the art, descriptions for each of the parts will be omitted.

A fuel cell system 100 according to an exemplary embodiment of the present invention may include bypass valves 40a and 40b. The bypass valve 40a illustrated in FIG. 1 may be disposed between an outlet of an air blower 20 and an inlet of a humidifier 30. By adjusting an opening degree of the bypass valve 40a, a controller 80 may bypass some of air, to be supplied to the humidifier 30 through the air blower 20, to a discharge port. Based on the adjustment of the opening degree by the controller 80, the amount of air to be bypassed to the discharge port may be adjusted.

The bypass valve 40b illustrated in FIG. 2 may be disposed between an outlet of a humidifier 30 and an inlet of a fuel cell stack 50. By adjusting an opening degree of the bypass valve 40b, a controller 80 may bypass some of the air, to be supplied to the inlet of the fuel cell stack 50 through the humidifier 30, to a discharge port. In other words, based on the adjustment of the opening degree, adjusted by the controller 80, the amount of air to be bypassed to the discharge port may be adjusted. The bypass valves 40a and 40b may be disposed between a bypass passage and a passage at an inlet of the fuel cell stack 50.

Figure 3:
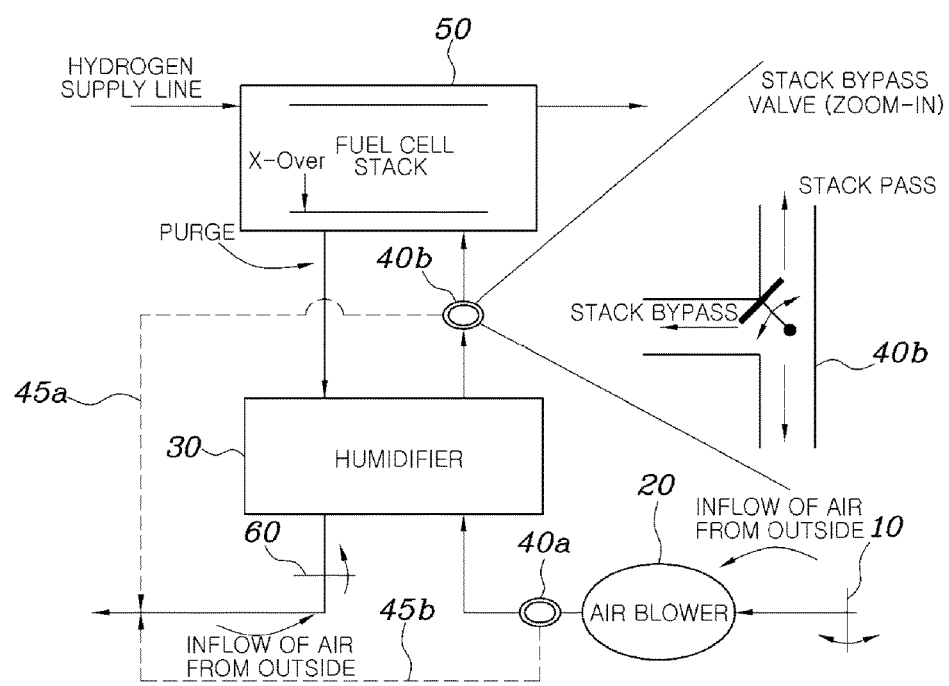
FIG. 3 is an exemplary block diagram illustrating relations among a fuel cell stack, a humidifier, an air blower, and an air discharge port in a fuel cell system according to an exemplary embodiment of the present invention.

FIG. 3 is an exemplary block diagram illustrating relations among a fuel cell stack, a humidifier, an air blower, and an air discharge port in a fuel cell system according to an exemplary embodiment of the present invention. Hydrogen crossed over from an anode to cathode and purged hydrogen, which may be generated by the temperature and humidified state of the fuel cell stack 50 and by the difference between the anode pressure and cathode pressure, may be emitted to a discharge port through the humidifier 30. Even though an air shutoff valve 60 may be disposed within the outlet to prevent inflow of air from the discharge port to the humidifier 30, air may flow into the system from the exterior.

Furthermore, one or more bypass valves 40a and 40b may be disposed within a fuel cell system. A first bypass valve 40a may be disposed between an air blower 20 and a humidifier 30, and a second bypass valve 40b may be disposed between the humidifier 30 and an inlet of a fuel cell stack 50. The bypass valves 40a and 40b may each be a three-way valve disposed at a branch point between a passage at an inlet of the fuel cell stack 50 and bypass passages 45a and 45b. By adjusting the opening degree of the bypass valves 40a and 40b, the controller 80 may be configured to adjust the amount of air passing through the stack and the amount of air bypassing the stack. In addition, the controller 80 may be configured to estimate a hydrogen concentration within an air supply system which will be described later, and may be configured to adjust the opening degree of the bypass valves 40a and 40b based on the estimated hydrogen concentration.

Figure 4:
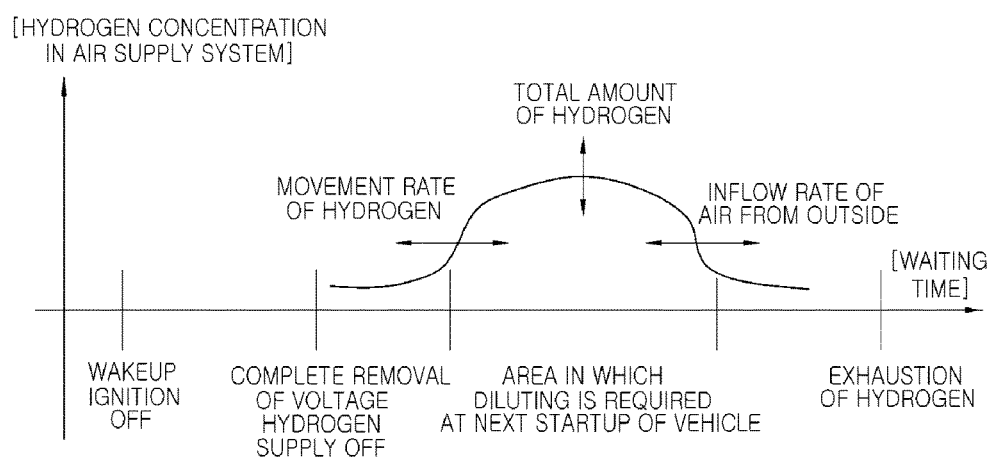
FIG. 4 is an exemplary graph illustrating a variation of a hydrogen concentration inside an air supply system included in a fuel cell system of the present invention, according to the elapsed time after an ignition of a fuel cell vehicle is turned off or after Wakeup according to an exemplary embodiment of the present invention.

FIG. 4 is an exemplary graph illustrating a variation of a hydrogen concentration within an air supply system included in a fuel cell system of the present invention, according to the elapsed time after an ignition of a fuel cell vehicle is turned off or after a Wakeup mode. In particular, a Wakeup mode or state is described as follows. In response to determining that an ignition turned-off state, in which a fuel cell system does not operate, has been active for a predetermined period of time, a controller 80 of a fuel cell vehicle may be configured to operate an air shutoff valve 60 to prevent inflow of air from exterior into a fuel cell stack 50. However, as time passes, air flowing in from the exterior to a cathode is delivered to an anode. Under this situation, when the vehicle is started, substantially high voltage may be partially generated and a carbon support material may be oxidized, thus causing performance degradation in a fuel cell. Consequently, to adjust the supply of hydrogen, a fuel cell controller 80 is required to periodically be woken up (e.g., initiated from a standby mode or activated from a sleep mode). This process is called Wakeup. In other words, both after the ignition is turned off and after Wakeup may refer to a period when hydrogen is not supplied to a fuel cell stack.

A method of controlling a fuel cell system of the present invention may include: estimating hydrogen concentrations in an air supply system and in an air discharge system after an ignition is turned off or after a Wakeup; and adjusting an opening degree of a bypass valve when the vehicle is started based on the estimated hydrogen concentration. In particular, the air supply system may include a cathode of a fuel cell stack, a humidifier, and an air blower, and the air discharge system may include an air discharge part for discharging air from the fuel cell stack. The subject of the above mentioned processes may be a fuel cell controller or a particular controller (e.g., the controller may be configured to execute the method).

To estimate a hydrogen concentration, the elapsed time after an ignition is turned off or the elapsed time after hydrogen is supplied by Wakeup may be measured. When the measured time is greater than a first reference time period, hydrogen concentrations in the air supply system and in the air discharge system may be predicted to be increased. Additionally, the elapsed time after the ignition is turned off or the elapsed time after hydrogen is supplied by a Wakeup may be measured and when the measured time is greater than a second reference time period, the hydrogen concentrations in the air supply system and in the air discharge system may be predicted to be decreased.

Further, the elapsed time after the ignition is turned off or the elapsed time after hydrogen is supplied by the Wakeup may be measured and when the measured time is between the first reference time period and the second reference time period, the hydrogen concentrations in the air supply system and in the air discharge system may be predicted to have been increased. Particularly, the first reference time period may be set to be decreased as the amount of hydrogen crossover from an anode to a cathode in a fuel cell stack increases. The amount of hydrogen crossover depends on the pressure at an anode side and the temperature or a humidified state of the fuel cell stack. As the pressure at the anode side increases, as the temperature of the fuel cell stack increases, and as the humidified state of the fuel cell stack increases, the amount of hydrogen crossover may increase.

In addition, the first reference time period set when hydrogen purging occurs after an ignition is turned off may be set to be less than the time period set when hydrogen purging does not occur. The second reference time period may be set to be decreased as an inflow of air from exterior into the fuel cell stack increases. The increase of the air inflow may be determined by an air flow sensor (not illustrated). When the air flow sensor malfunctions, the increase of the air inflow may be determined by determining whether the temperature of the fuel cell stack increases or whether an air shutoff valve, which prevents inflow of air from the exterior, malfunctions.

The hydrogen pressure may be measured at the anode side when supply of hydrogen from the exterior is stopped, and as the hydrogen pressure measured at the anode side increases, the second reference time period may be set to be increased. On the other hand, as the hydrogen pressure measured at the anode side decreases, the second reference time period may be set to be increased. The second reference time period set when hydrogen purging occurs after the ignition is turned off may also be set to be greater than the time period set when hydrogen purging does not occur.

The above descriptions are illustrated in a graph in FIG. 4. In other words, when a predetermined time period has elapsed, a hydrogen concentration increases. Then, when another predetermined time period has elapsed, the hydrogen concentration decreases. In between the two different time periods, the hydrogen concentration may remain substantially high. When a hydrogen concentration is predicted to be increased, or when the hydrogen concentration is predicted to have been increased, air supplied from an air blower may be bypassed to a discharge port of a fuel cell stack by adjusting an opening degree of a bypass valve. When a hydrogen concentration is predicted to be decreased, air supplied from the air blower may not be bypassed to the discharge port of the fuel cell stack by adjusting the opening degree of the bypass valve.

Moreover, the amount of air bypassed to the discharge port may be varied by adjusting the opening degree of the bypass valve based on the estimated hydrogen concentration. As the estimated hydrogen concentration increases, the amount of air bypassed to the discharge port may be increased by increasing the opening degree of the bypass valve. In addition, as the estimated hydrogen concentration increases, the amount of air bypassed to the discharge port may be increased by increasing time period during which the opening degree of the bypass valve is adjusted. In other words, by adjusting the opening degree of the bypass valve, the amount of air bypassed to the discharge port of the fuel cell stack may be increased. In particular, after the valve is remained open to a predetermined degree, the opening degree of the bypass valve may again be adjusted to supply air to the inlet of the fuel cell stack. In other words, to adjust the amount of air to bypass to the discharge port, the opening degree of the bypass valve may be increased and the time period during which the valve is open to a predetermined degree may be increased.

The estimated hydrogen concentration may be proportional to the hydrogen pressure measured at the anode side when supply of hydrogen from the exterior is stopped. When hydrogen purging occurs after an ignition is turned off, the estimated hydrogen concentration may be proportional to the amount of purged hydrogen. The total amount of hydrogen in a fuel cell stack 50 may be a sum of the amount of residual hydrogen in an anode and the amount of purged hydrogen by hydrogen purging occurring after the ignition of a fuel cell vehicle is turned off, the amount of residual hydrogen being calculated through the hydrogen pressure after voltage of the fuel cell stack 50 is completely removed. The maximum hydrogen concentration in an air supply system of a fuel cell system 100 may be proportional to the total amount of hydrogen.

Further, the movement rate of hydrogen that moves to the inside of the air supply system may be the rate of hydrogen crossover from an anode to a cathode. Purged hydrogen may move directly to the air supply system. When air flows in from the exterior, voltage of the fuel cell stack 50 may be increased. Then, as the voltage is depleted by a fuel cell load device (not illustrated) connected to the fuel cell stack 50, the residual hydrogen inside the fuel cell stack 50 may be consumed.

As illustrated in FIG. 4, a hydrogen concentration in the air supply system may vary according to the total amount of hydrogen, the movement rate of hydrogen, and the inflow rate of air from outside. Based on this data, the controller 80 may be configured to estimate the hydrogen concentration in the air supply system, and may adjust the opening degree of bypass valves 40*a* and 40*b* based on the estimated hydrogen concentration. Particularly, when an air blower 20 is started, hydrogen accumulated in the air supply system may be rapidly discharged. By estimating the concentration of hydrogen accumulated in the air supply system, bypass valves 40*a* and 40*b* may be operated when the air blower is started. Accordingly, air passed through the air blower 20 may be supplied to the discharge port to dilute the hydrogen.

A fuel cell system and a method of controlling the same according to an exemplary embodiment of the present invention may bypass air to a discharge port through a bypass valve and a bypass passage indisposed within an outlet of an air blower or indisposed within a passage at an inlet of a fuel cell stack. Therefore, though hydrogen accumulated in an air supply system may be rapidly discharged when the air blower is started, the hydrogen diluted with the bypassed air may be discharged. In addition, since a hydrogen concentration in the air supply system may be estimated, the opening degree of the bypass valve may be adjusted based on the estimated hydrogen concentration, whereby air of which the amount corresponds to the amount of hydrogen to be discharged may be supplied to the discharge port.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of controlling the fuel cell system, comprising:
   estimating, by a controller, after an ignition is turned off or after hydrogen is supplied by a Wakeup, hydrogen concentrations in an air supply system and an air discharge system, based on a pressure of hydrogen measured at an anode; and
   adjusting, by the controller, an opening degree of at least one bypass valve when a vehicle is subsequently started, based on the estimated hydrogen concentrations,
   wherein the air discharge system includes an air discharge part that discharges air from a fuel cell stack,
   wherein the air supply system includes a cathode of the fuel cell stack, a humidifier, and an air blower,
   wherein the fuel cell system includes the at least one bypass valve disposed between a passage within an inlet of the fuel cell stack and a bypass passage branched from the passage within the inlet and connected to a discharge port of the fuel cell stack; and the controller configured to bypass air supplied from the air blower to the discharge port by adjusting the opening degree of the at least one bypass valve,
   wherein estimating the hydrogen concentrations includes predicting, by the controller, by measuring a time elapsed after the ignition is turned off or elapsed after hydrogen is supplied by the Wakeup, that the hydrogen concentrations in the air supply system and the air discharge system have been increased when the measured time is between a first reference time period and a second reference time period, and
   wherein in adjusting the opening degree of the bypass valve, air supplied from the air blower is bypassed to the discharge port of the fuel cell stack by adjusting the opening degree of the bypass valve when the hydrogen concentrations are predicted to have been increased.

2. The method for controlling of claim 1, wherein:
   estimating the hydrogen concentrations includes: predicting, by the controller, based on measuring a time elapsed after the ignition is turned off or elapsed after hydrogen is supplied by the Wakeup, that the hydrogen concentrations in the air supply system and the air discharge system will be increased when the measured time is greater than a first reference time period; and
   in adjusting the opening degree of the bypass valve, air supplied from the air blower is bypassed to the discharge port of the fuel cell stack by adjusting the opening degree of the bypass valve when the hydrogen concentrations are predicted to be increased.

3. The method for controlling of claim 1, wherein:
   estimating the hydrogen concentrations includes predicting, by the controller, by measuring an elapsed time after the ignition is turned off or after hydrogen is supplied by the Wakeup, that the hydrogen concentrations in the air supply system and the air discharge system will be decreased when the measured time is greater than a second reference time period; and
   in adjusting the opening degree of the bypass valve, air supplied from the air blower is not bypassed to a discharge port of the fuel cell stack by adjusting the opening degree of the bypass valve when the hydrogen concentrations are predicted to be decreased.

4. The method for controlling of claim 1, wherein the adjustment of the opening degree of the bypass valve includes varying, by the controller, an amount of air bypassed to the discharge port by adjusting the opening degree of the bypass valve based on the estimated hydrogen concentrations.

5. The method for controlling of claim 4, wherein the adjustment of the opening degree of the bypass valve includes increasing, by the controller, the amount of air bypassed to the discharge port by increasing the opening degree of the bypass valve as the estimated hydrogen concentrations are increased.

6. The method for controlling of claim 4, wherein the adjustment of the opening degree of the bypass valve includes increasing, by the controller, the amount of air bypassed to the discharge port by increasing a time period during which the opening degree of the bypass valve is adjusted as the estimated hydrogen concentrations are increased.

7. The method for controlling of claim 4, wherein the estimated hydrogen concentrations are proportional to a pressure of hydrogen measured at an anode when supply of hydrogen from an exterior is stopped.

8. The method for controlling of claim 4, wherein the estimated hydrogen concentrations are proportional to an amount of purged hydrogen when hydrogen purging occurs after the ignition is turned off.

9. The method for controlling of claim 2, wherein if hydrogen purging occurs after the ignition is turned off, the first reference time period is set to be less than the first reference time period set when the hydrogen purging does not occur.

10. The method for controlling of claim 3, wherein the second reference time period is decreased as an inflow of air from an exterior to a fuel cell stack is increased.

11. The method for controlling of claim 10, wherein the increase in the inflow of air from the exterior is determined by a value measured by an air flow sensor, or determined by whether a temperature of the fuel cell stack increases or whether an air shutoff valve for preventing inflow of air from the exterior operates.

12. The method for controlling of claim 3, wherein the second reference time period is increased as a pressure of hydrogen at an anode is increased, and the second reference time period is decreased as the pressure of hydrogen at the anode is decreased, the pressure of hydrogen being measured at the anode when supply of hydrogen from an exterior is stopped.

13. The method for controlling of claim 3, wherein the second reference time period set when hydrogen purging occurs after the ignition is turned off is greater than the second reference time period set when the hydrogen purging does not occur.

14. The method for controlling of claim 1, wherein the first reference time period is decreased as an amount of hydrogen crossover from an anode to a cathode of a fuel cell stack is increased.

15. The method for controlling of claim 1, wherein the second reference time period is increased as a pressure of hydrogen at an anode is increased, and the second reference time period is decreased as the pressure of hydrogen at the anode is decreased, the pressure of hydrogen being measured at the anode when supply of hydrogen from an exterior is stopped.

16. The method for controlling of claim 1, wherein the second reference time period is decreased as an inflow of air from outside to a fuel cell stack is increased.

17. The method for controlling of claim 1, wherein the second reference time period is increased as a pressure of hydrogen at an anode is increased, and the second reference time period is decreased as the pressure of hydrogen at the anode is decreased, the pressure of hydrogen being measured at the anode when supply of hydrogen from an exterior is stopped.

18. The method for controlling of claim 1, wherein the second reference time period set when hydrogen purging occurs after the ignition is turned off is greater than the second reference time period set when the hydrogen purging does not occur.

\* \* \* \* \*